(12) United States Patent
Grandvallet et al.

(10) Patent No.: US 8,752,584 B2
(45) Date of Patent: Jun. 17, 2014

(54) ROCKER VALVE MECHANISM AND ROCKER VALVE

(75) Inventors: Gilles Grandvallet, Lancrans (FR); Didier Richardet, Crassier (CH)

(73) Assignee: Fluid Automation Systems S.A., Versoix (CH)

( * ) Notice: Subject to any disclaimer, the term of this patent is extended or adjusted under 35 U.S.C. 154(b) by 524 days.

(21) Appl. No.: 12/443,997

(22) PCT Filed: Oct. 12, 2006

(86) PCT No.: PCT/EP2006/009842
§ 371 (c)(1),
(2), (4) Date: Apr. 2, 2009

(87) PCT Pub. No.: WO2008/043381
PCT Pub. Date: Apr. 17, 2008

(65) Prior Publication Data
US 2010/0043738 A1 Feb. 25, 2010

(51) Int. Cl.
*F16K 11/065* (2006.01)
(52) U.S. Cl.
USPC .............. 137/625.48; 137/554; 137/625.44; 137/553; 137/556.6
(58) Field of Classification Search
USPC ............ 137/625.44, 553–556.6, 625.48, 627; 251/279, 280, 251, 262, 263
See application file for complete search history.

(56) References Cited

U.S. PATENT DOCUMENTS

| | | | |
|---|---|---|---|
| 2,935,086 A | 5/1960 | Lehman et al. | |
| 3,683,962 A * | 8/1972 | Good | 137/868 |
| 4,250,924 A | 2/1981 | Sakakibara et al. | |
| 4,569,431 A * | 2/1986 | Roeker | 192/131 R |
| 4,863,141 A | 9/1989 | Brunner | |
| 5,318,071 A | 6/1994 | Gaiardo | |
| 5,685,337 A | 11/1997 | Yoo | |
| 6,003,552 A * | 12/1999 | Shank et al. | 137/625.44 |
| 6,318,408 B1 * | 11/2001 | Fukano et al. | 137/625.44 |
| 6,484,751 B2 * | 11/2002 | Lafler et al. | 137/554 |
| 6,726,173 B2 * | 4/2004 | Hettinger et al. | 251/129.17 |
| 2003/0107018 A1 | 6/2003 | Hettinger et al. | |

FOREIGN PATENT DOCUMENTS

| | | |
|---|---|---|
| EP | 1045150 A3 | 10/2003 |
| GB | 504172 | 4/1939 |
| WO | WO-89/04935 | 6/1989 |
| WO | WO-00/03166 | 1/2000 |
| WO | WO-02/061313 A1 | 8/2002 |

* cited by examiner

Primary Examiner — Jason Boeckmann
Assistant Examiner — Joel Zhou
(74) Attorney, Agent, or Firm — The Ollila Law Group LLC

(57) ABSTRACT

A rocker valve mechanism (125) is provided according to the invention. The rocker valve mechanism (125) includes a port portion (110) including a plurality of ports (113-115), a first plunger (130), and a second plunger (131) acting in opposition and moving substantially in parallel with the first plunger (130). The rocker valve mechanism (125) is biased toward a first position blocking a third port (115) and configured to be actuated to a second position blocking a first port (113).

23 Claims, 7 Drawing Sheets

ROCKER VALVE MECHANISM AND ROCKER VALVE

BACKGROUND OF THE INVENTION

1. Field of the Invention

The present invention relates to a rocker valve mechanism and a rocker valve.

2. Statement of the Problem

A valve comprises a valve body containing a valve mechanism. Inlet and outlet ports communicate between the valve mechanism and the outside world. The body often comprises portions that are assembled to form a valve chamber including one or more valve seats and two or more passages, such as inlet and outlet ports. The valve mechanism can move in the valve body and can selectively contact and unblock the one or more valve seats in order to perform the valve function, thereby selecting and deselecting ports.

It is increasingly desirable to make a valve unit both compact and interchangeable. In addition, it is desirable to make a valve unit configurable, including the ability to select and/or configure actuation forces, port sizes, and port spacings, for example. Such configurability and interchangeability make the valve unit more flexible and cheaper to use.

SUMMARY OF THE INVENTION

A rocker valve mechanism is provided according to the invention. The rocker valve mechanism comprises a port portion including a plurality of ports, a first plunger, and a second plunger acting in opposition and moving substantially in parallel with the first plunger, with the rocker valve mechanism being biased toward a first position blocking a first port and configured to be actuated to a second position blocking a third port.

A rocker valve is provided according to the invention. The rocker valve comprises a valve body and a rocker valve mechanism located at least partially within the valve body. The rocker valve mechanism comprises a port portion including a plurality of ports, a first plunger, and a second plunger acting in opposition and moving substantially in parallel with the first plunger. The rocker valve mechanism is biased toward a first position blocking a first port and configured to be actuated to a second position blocking a third port.

A rocker valve is provided according to the invention. The rocker valve comprises a valve body and a rocker valve mechanism located at least partially within the valve body. The rocker valve mechanism comprises a port portion including a plurality of ports, a first plunger, and a second plunger acting in opposition and moving substantially in parallel with the first plunger. The rocker valve mechanism is biased toward a first position blocking a first port and configured to be actuated to a second position blocking a third port. The rocker valve mechanism further comprises a seal member extending over both the first plunger and the second plunger. The seal member is movable by the first plunger and by the second plunger to alternatingly contact a first valve seat of the first port and a second valve seat of the third port.

ASPECTS OF THE INVENTION

In one embodiment of the rocker valve mechanism, the rocker valve mechanism is biased toward the first position with the first plunger blocking the first port and configured to be actuated to the second position with the second plunger blocking the third port.

In another embodiment of the rocker valve mechanism, the plurality of ports are separated by predetermined spacings.

In yet another embodiment of the rocker valve mechanism, the plurality of ports comprise a plurality of configurable ports.

In yet another embodiment of the rocker valve mechanism, the rocker valve mechanism further comprises a seal member extending over both the first plunger and the second plunger, with the seal member being movable by the first plunger and by the second plunger to alternatingly contact a first valve seat of the first port and a second valve seat of the third port.

In yet another embodiment of the rocker valve mechanism, the rocker valve mechanism further comprises a pivot post extending from the port portion, an upper pivot arm pivotally attached to the pivot post, a lower pivot arm pivotally attached to the pivot post, the first plunger configured to be actuated by an actuator, with the first plunger being pivotally attached to first ends of the upper pivot arm and the lower pivot arm, and the second plunger configured to be biased toward a closed position by a rocker biasing device, with the second plunger being pivotally attached to second ends of the upper pivot arm and the lower pivot arm.

In yet another embodiment of the rocker valve mechanism, the rocker valve mechanism further comprises a rocker biasing device configured to place a biasing force on the second plunger and an actuator configured to bias the first plunger and a first seal region of the seal member toward a normally closed position and into contact with a first valve seat of the first port.

In another embodiment of the rocker valve, the rocker valve mechanism comprises a modular rocker valve mechanism.

In yet another embodiment of the rocker valve, the rocker valve further comprises a manual actuation plunger configured to transfer an external actuation force to the rocker valve mechanism in opposition to an armature biasing device.

In yet another embodiment of the rocker valve, the rocker valve further comprises a manual actuation plunger configured to transfer an external actuation force to the rocker valve mechanism in opposition to an armature biasing device, with the manual actuation plunger including an actuator projection including an angled face.

In yet another embodiment of the rocker valve, the rocker valve further comprises a position sensor that generates a positional signal related to an actuation position of the rocker valve mechanism.

In yet another embodiment of the rocker valve, the rocker valve further comprises a magnet affixed to the rocker valve mechanism and a position sensor affixed to the valve body, wherein the position sensor generates a positional signal related to an actuation position of the rocker valve mechanism.

DESCRIPTION OF THE DRAWINGS

The same reference number represents the same element on all drawings. It should be understood that the drawings are not necessarily to scale.

DETAILED DESCRIPTION OF THE INVENTION

FIGS. 1-7 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
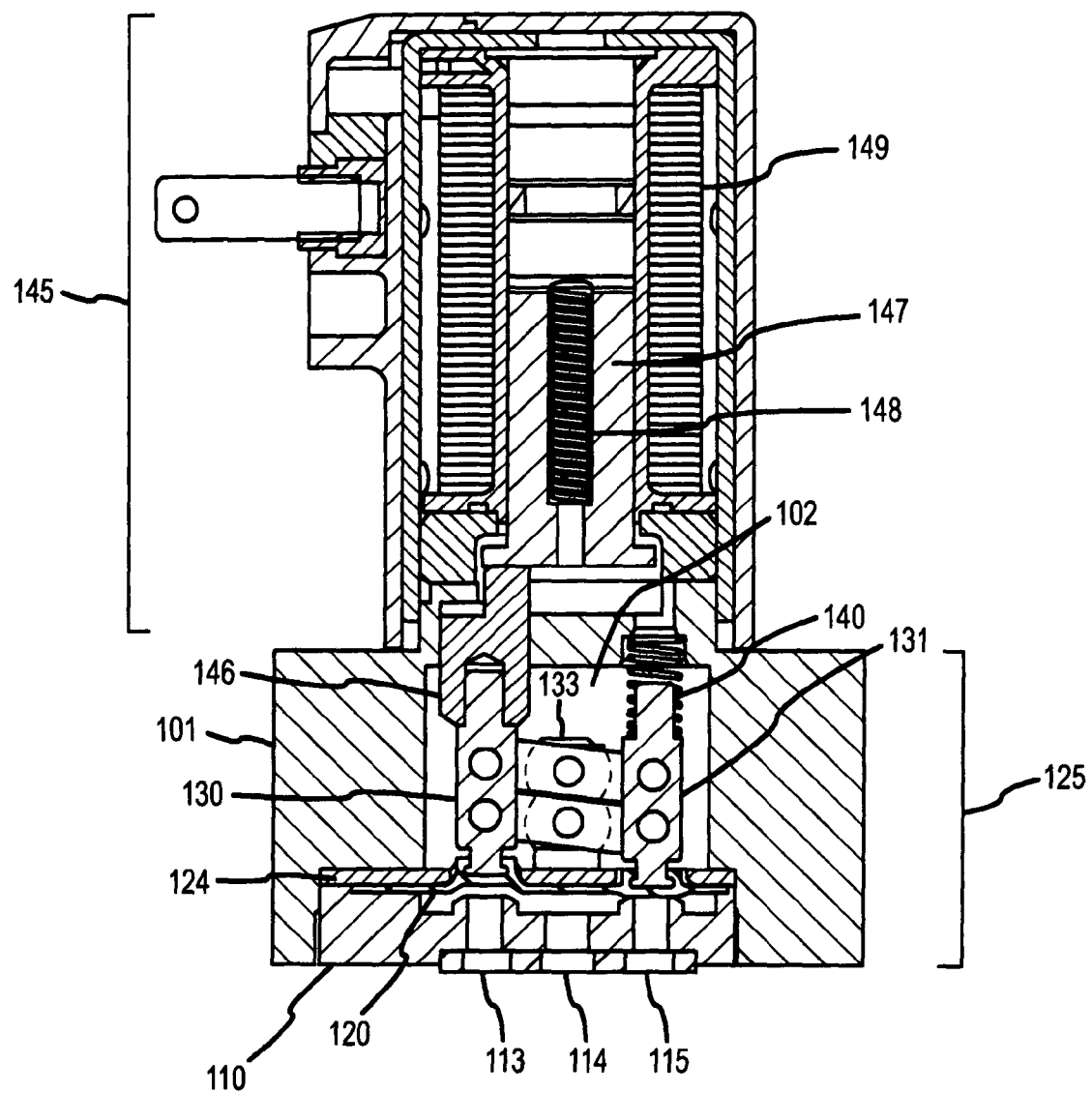
FIG. 1 is a cross-sectional view of a rocker valve according to an embodiment of the invention.

FIG. 1 is a cross-sectional view of a rocker valve 100 according to an embodiment of the invention. The rocker valve 100 includes a valve body 101 including a chamber 102, a rocker valve mechanism 125 located at least partially within the chamber 102, and an actuator 145. The actuator 145 actuates and moves the rocker valve mechanism 125. The rocker valve 100 further includes a first port 113, a second port 114, and a third port 115. The first port 113 communicates with a first valve seat 112a and the third port 115 communicates with a second valve seat 112b (see FIG. 2). The rocker valve 100 can block and unblock the first port 113 and the third port 115 and can therefore regulate a fluid flow. The components of the rocker valve mechanism 125 and their operation are discussed in more detail below in conjunction with FIG. 2.

The actuator 145 includes an actuator plunger 146, an armature 147, an armature biasing device 148, and an electromagnetic coil 149. The armature 147 is actuated by the coil 149. The armature 147 contacts the actuator plunger 146, and the actuator plunger 146 in turn acts on and actuates the rocker valve mechanism 125.

In the embodiment shown, the actuator 145 comprises an electromagnet actuator. However, it should be understood that the actuator 145 can comprise any manner of actuator that moves the actuator plunger 146 in a substantially reciprocating motion.

It can be seen from the figure that the armature 147, and consequently the rocker valve mechanism 125, are in intermediate positions. In a normal, non-actuated position (i.e., when the electromagnetic coil 149 is de-energized), the armature 147 is released and is biased by the armature biasing device 148 to a fully downward position (see FIG. 3). The armature biasing device 148 acts substantially in opposition to a rocker biasing device 140. When the electromagnetic coil 149 is not energized, the armature biasing device 148 overpowers the rocker biasing device 140. In addition, the rocker biasing device 140 forces the actuator plunger 146 to follow the armature 147 when the armature 147 moves to the fully upward, actuated position (see FIG. 2).

The rocker valve mechanism 125 includes a first plunger 130, a second plunger 131, and a seal member 120. The second plunger 131 acts in opposition to and moves substantially in parallel with the first plunger 130. The first plunger 130 and the second plunger 131 move portions of the seal member 120 to block and unblock the first port 114 and the third port 115.

The actuation of the rocker valve mechanism 125 is provided by the actuator 145 through the actuator plunger 146. The rocker valve mechanism 125 is configured to be biased toward a first, non-actuated position blocking the first port 113 (see FIG. 3). The rocker valve mechanism 125 is further configured to be actuated to a second position blocking the third port 115 (see FIG. 2). This actuated position occurs when the electromagnetic coil 149 is energized. The first plunger 130 can block the first port 113 and the second plunger 131 can alternatingly block the third port 115. Therefore, the first port 113 comprises a normally closed (NC) port and the third port 115 comprises a normally open (NO) port.

The rocker valve mechanism 125 includes a port portion 110. The port portion 110 includes the ports 113-115, wherein the ports 113-115 are separated by predetermined spacings. The spacings can be varied, along with the size and shape of the ports (see FIG. 7 and the accompanying discussion). Therefore, the rocker valve 100 in some embodiments can consequently have very small distances between port axes, enabling a reduction in overall valve size.

The seal member 120 is positioned between the port portion 110 and the valve body 101 when the rocker valve mechanism 125 is assembled. The port portion 110 in some embodiments receives at least part of the seal member 120. Advantageously, the seal member 120 can seal the port portion 110 to the valve body 101.

In some embodiments, the seal member 120 is retained in the valve body 101 by a seal retainer 124. The seal retainer 124 is positioned between the port portion 110 and the valve body 101. The seal retainer 124 holds the seal member 120 in place against the port portion 110.

In some embodiments, the seal member 120 is contacted and displaced by both the first plunger 130 and the second plunger 131. Therefore, the seal member 120 is movable by the first plunger 130 and the second plunger 131 to alternatingly block and unblock the first port 113 and the third port 115.

The rocker valve mechanism 125 in some embodiments comprises a modular unit. Because of the modularity of the rocker valve mechanism 125, a port portion 110 can be selected wherein the ports 113-115 have desired characteristics. For example, the port portion 110 can be selected according to desired port sizes and/or according to desired port spacings, among other things. In addition, because of the modularity, the rocker valve mechanism 125 can be selected according to desired valve characteristics, such as valve actuation speed, plunger stroke length, valve actuation force, biasing device force/size, etc. Other valve characteristics are contemplated and are within the scope of the description and claims.

Figure 2:
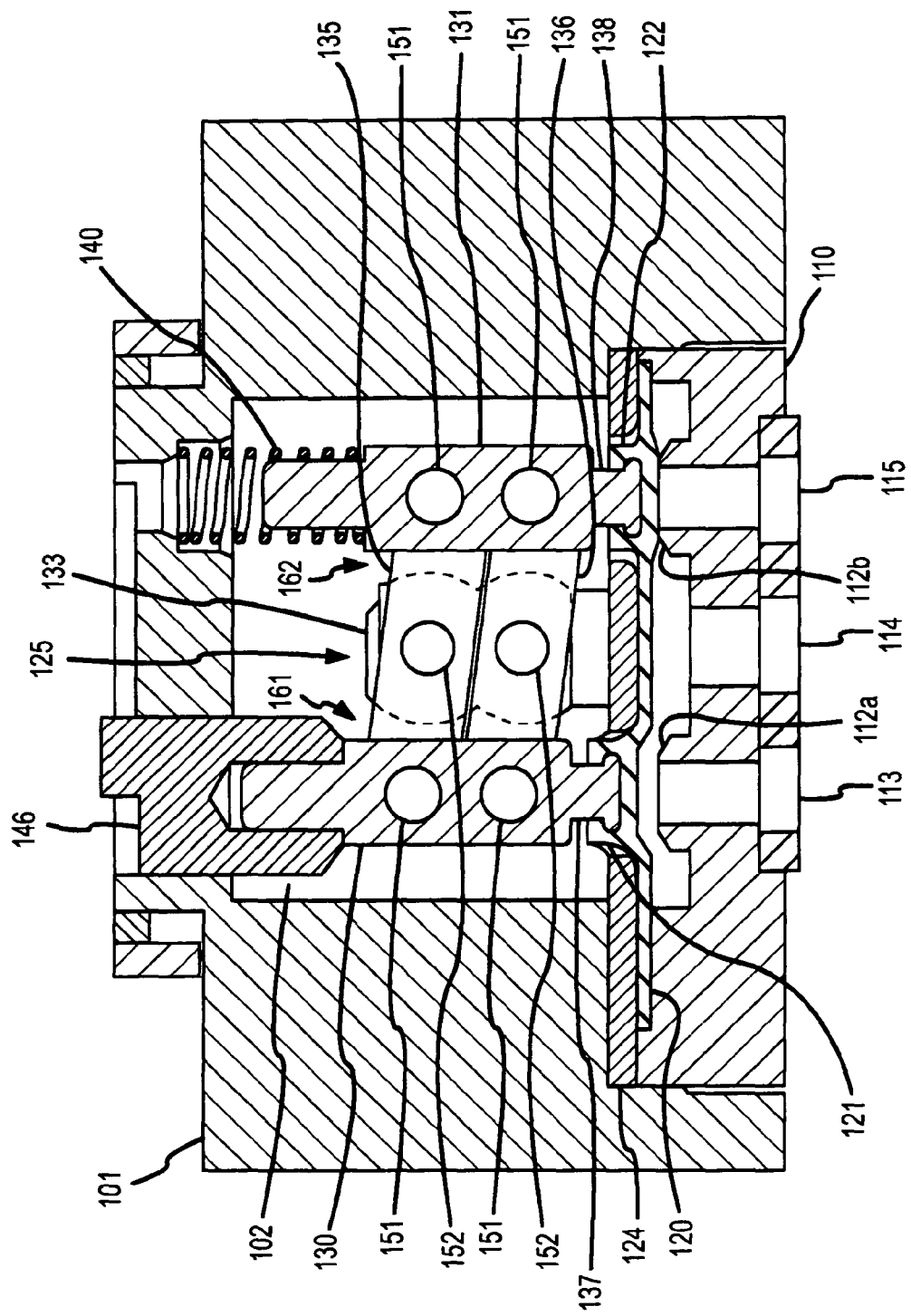
FIG. 2 is a cross-sectional view showing detail of the rocker valve mechanism according to an embodiment of the invention.

FIG. 2 is a cross-sectional view showing detail of the rocker valve mechanism 125 according to an embodiment of the invention. This figure shows the rocker valve 100 in an actuated position wherein the electromagnetic coil 149 is energized and pulls the actuator plunger 146 upward, against the armature biasing device 148. Consequently, the first port 113 is unblocked and the third port 115 is blocked.

In addition to the previously recited components, the rocker valve mechanism 125 comprises a pivot post 133 extending from the port portion 110. An upper pivot arm 135 is pivotally affixed to the pivot post 133 by a pivot pin 152. A lower pivot arm 136 is pivotally affixed to the pivot post 133 by another pivot pin 152. The first plunger 130 is pivotally affixed by pivot pins 151 to both the upper pivot arm 135 and the lower pivot arm 136 at first ends 161. The second plunger 131 is pivotally affixed by pivot pins 151 to both the upper pivot arm 135 and the lower pivot arm 136, but at second ends

162. The lengths of the pivot arms 135 and 136 on either side of the pivot post 133 can be equal in length or can be unequal in length.

The second plunger 131 is biased downward by the rocker biasing device 140. The second plunger 131 can therefore press a corresponding region of the seal member 120 against the second valve seat 112b. In the embodiment shown, the rocker biasing device 140 comprises a helical or coil spring. However, the rocker biasing device 140 can comprise any manner of biasing device.

It can be seen from this figure that a portion of the rocker biasing device 140 can fit to or be retained by an end of the second plunger 131 in some manner. Another portion of the rocker biasing device 140 can fit to or be retained by the valve body 101. In the embodiment shown, a portion of the rocker biasing device 140 fits into a bore or receptacle formed in the chamber 102 of the valve body 101.

When the coil 149 is energized, the first plunger 130 is allowed by the actuator plunger 146 to move upward. At the same time, the second plunger 131 is depressed by the rocker biasing device 140. As a result, the upper pivot arm 135 and the lower pivot arm 136 together move the first plunger 130 upward. Therefore, when the first plunger 130 is released by the actuator plunger 146, the upper and lower pivot arms 135 and 136 transfer the actuation force provided by the rocker biasing device 140 to the first plunger 130. As a result, the third (NO) port 115 is blocked and the first (NC) port 113 is unblocked.

The two pivot arms 135 and 136 improve the rigidity of the mechanism. The rocker valve mechanism 125 therefore has less inherent slop and less inherent flexing, leading to an improved actuation stroke and an improved actuation force.

In some embodiments, the first plunger 130 includes a first plunger head 137 and the second plunger 131 includes a second plunger head 138. Correspondingly, the seal member 120 can include a first sealing region 121 and a second sealing region 122. The first and second sealing regions 121 and 122 can comprise receptacles, wherein the first plunger head 137 and the second plunger head 138 fit into the first sealing region 121 and the second sealing region 122. The first and second sealing regions 121 and 122 therefore can be attached to the first and second plungers 130 and 131. Consequently, the first and second plungers 130 and 131 can not only push a region of the seal member 120 downward, but can also pull a region of the seal member 120 upward. This improves the unblocking action of a plunger and increases a flow volume through the port.

Alternatively, the first and second plungers 130 and 131 can merely contact a top surface of the first and second sealing regions 121 and 122, where the first and second sealing regions 121 and 122 comprise heavier portions of the seal member 120 in order to accommodate movement and/or flexing of the seal member 120.

Advantageously, the rocker valve 100 can be configured by appropriate selection of the rocker valve mechanism 125 (or alternatively by selection of specific components). For example, the upper and lower pivot arms 135 and 136 can be chosen in order to select a lever arm and therefore to select a force and actuation stroke transmitted to the second plunger 131. It should be understood that the lengths of the pivot arms 135 and 136 on either side of the pivot post 133 do not necessarily have to be equal.

Another advantage is that a first or second sealing portion 121 or 122 is always displaced substantially perpendicularly to the corresponding valve seat 112a or 112b. In addition, the first or second sealing portion 121 or 122 is displaced substantially in parallel with the other sealing portion 122 or 121. This leads to improvements in sealing quality, including a higher pressure capability, increased flow through the rocker valve 100, reduced power consumption in the actuator 145, and increased life expectancy of the seal member 120.

Figure 3:
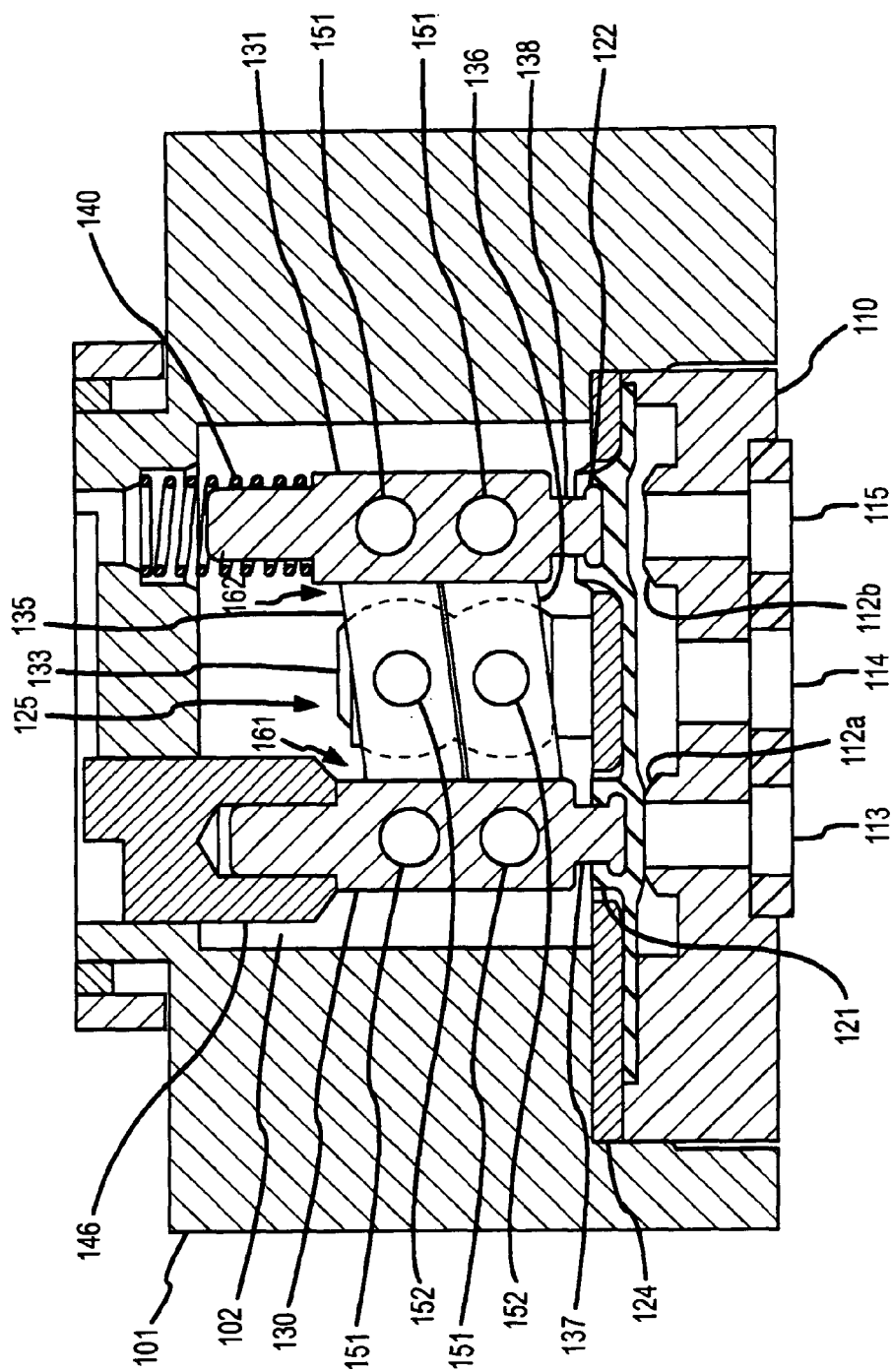
FIG. 3 is a cross-sectional view showing the rocker valve mechanism in a non-actuated position.

FIG. 3 is a cross-sectional view showing the rocker valve mechanism 125 in a non-actuated position. In this figure, the coil 149 has been de-energized, releasing the armature 147 and allowing the armature biasing device 148 to move the armature 147 and the actuator plunger 146 fully downward. As a result, the first plunger 130 is moved fully downward, blocking the first port 113. At the same time, the second plunger 131 has been lifted, unblocking the third port 115.

Figure 4:
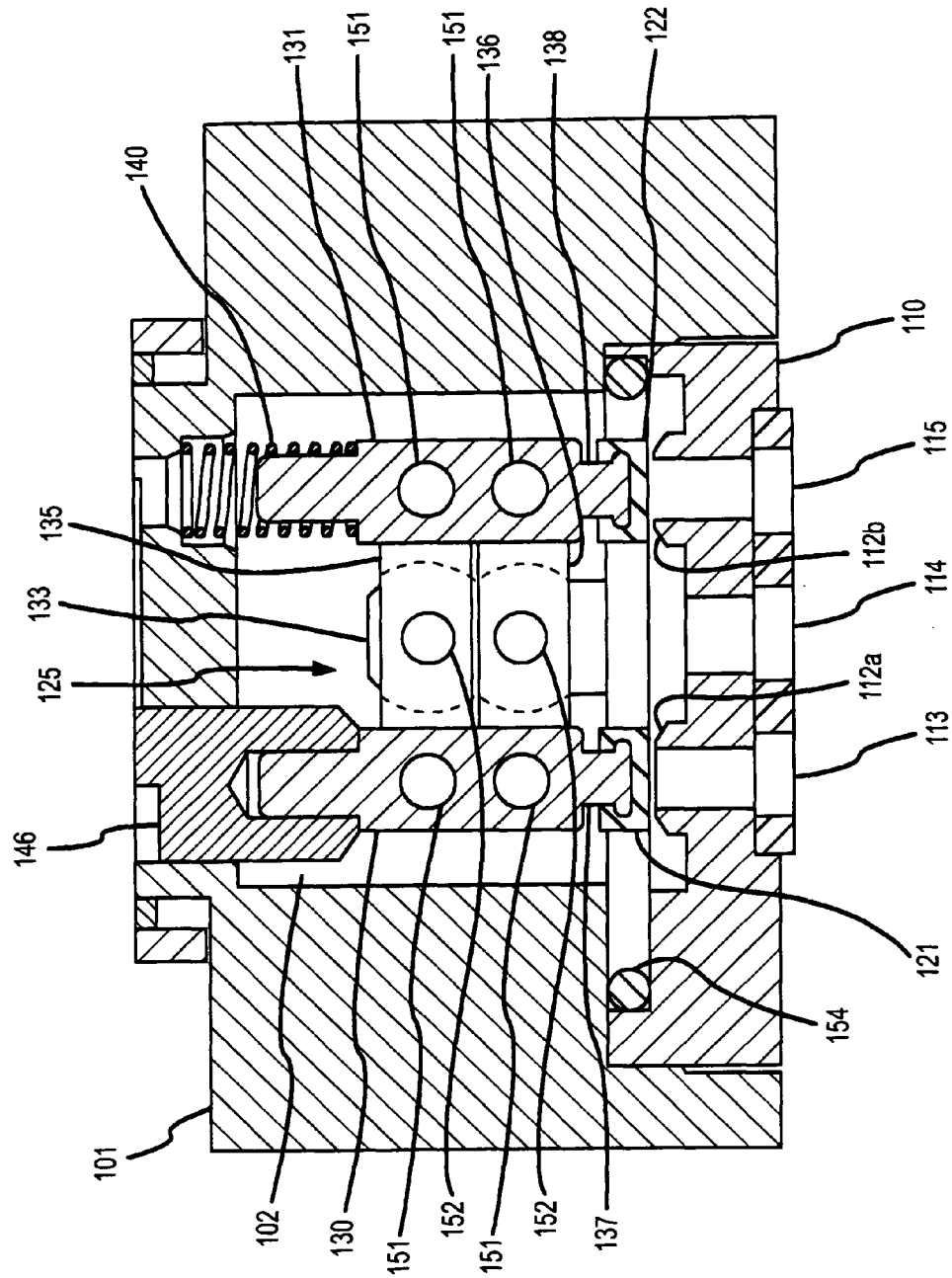
FIG. 4 is a cross-sectional view of the rocker valve mechanism according to an embodiment of the invention.

FIG. 4 is a cross-sectional view of the rocker valve mechanism 125 according to an embodiment of the invention. In this embodiment, the rocker valve mechanism 125 does not include the seal retainer 124 (see FIGS. 1-3). Instead, in this embodiment the rocker valve mechanism 125 includes a circumferential seal 154, wherein the circumferential seal 154 is compressed between and seals the port portion 110 and the valve body 101. In one embodiment, the circumferential seal 154 comprises an O-ring. However, the first and second plungers 130 and 131 still include the first and second sealing regions 121 and 122. The first and second sealing regions 121 and 122 in this embodiment can be separate from the circumferential seal 154.

Figure 5:
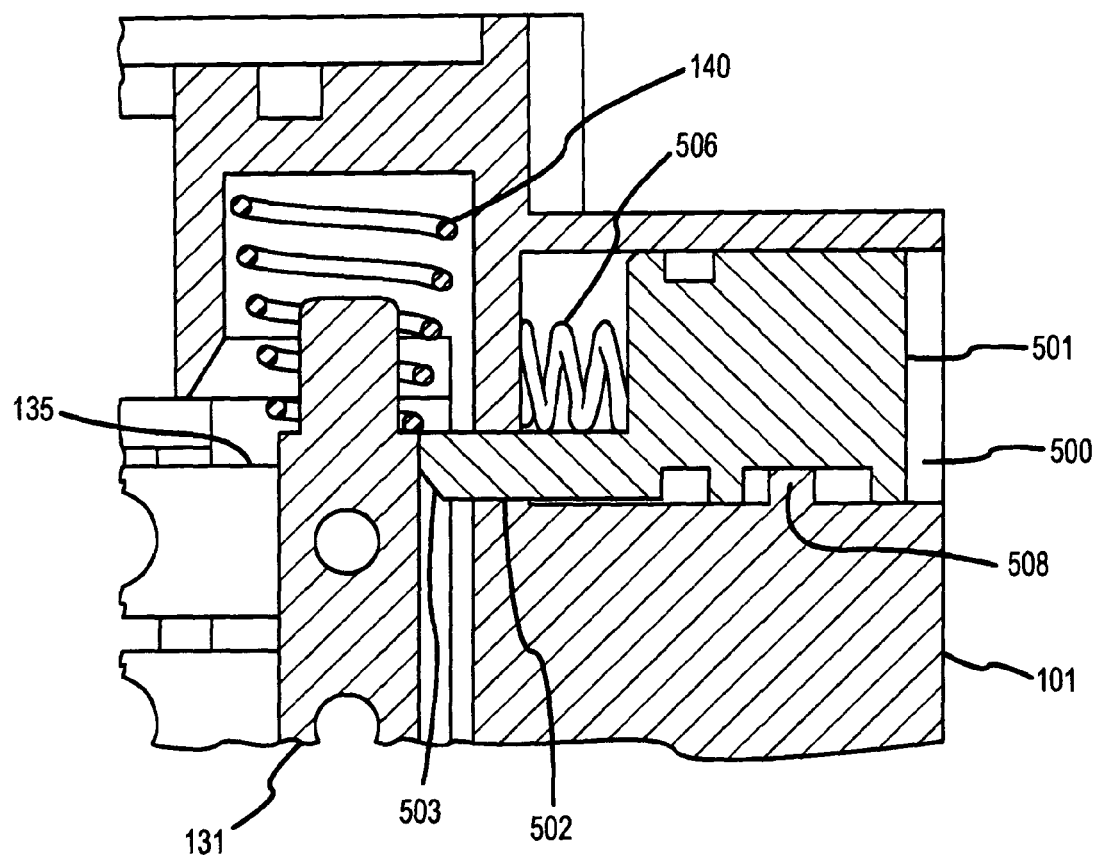
FIG. 5 is a partial cross-sectional view of the rocker valve mechanism according to an embodiment of the invention.

FIG. 5 is a partial cross-sectional view of the rocker valve mechanism 125 according to an embodiment of the invention. The rocker valve mechanism 125 in this embodiment additionally comprises a manual actuation plunger 501 and a manual plunger biasing device 506. The manual actuation plunger 501 resides in a bore 500 in the valve body 101 and can move in the bore 500 in a reciprocating manner. The bore 500 can include a stop 508 that prevents the manual actuation plunger 501 from escaping the bore 500. The manual plunger biasing device 506 resides in the bore 500 and is contacted by the manual actuation plunger 501. The manual plunger biasing device 506 returns the manual actuation plunger 501 to a retracted, non-actuated position when there is no actuation force on the manual actuation plunger 501.

The manual actuation plunger 501 includes an actuator projection 502 that extends from the manual actuation plunger 501. The actuator projection 502 includes an angled face 503. The actuator projection 502 and the angled face 503 are configured to contact a portion of the rocker valve mechanism 125 and manually force the rocker valve mechanism 125 from a non-actuated position to an actuated position.

In one embodiment, the angled face 503 contacts and depresses a portion of the second plunger 131. In another embodiment, the angled face 503 contacts and depresses a portion of the upper pivot arm 135.

Figure 6:
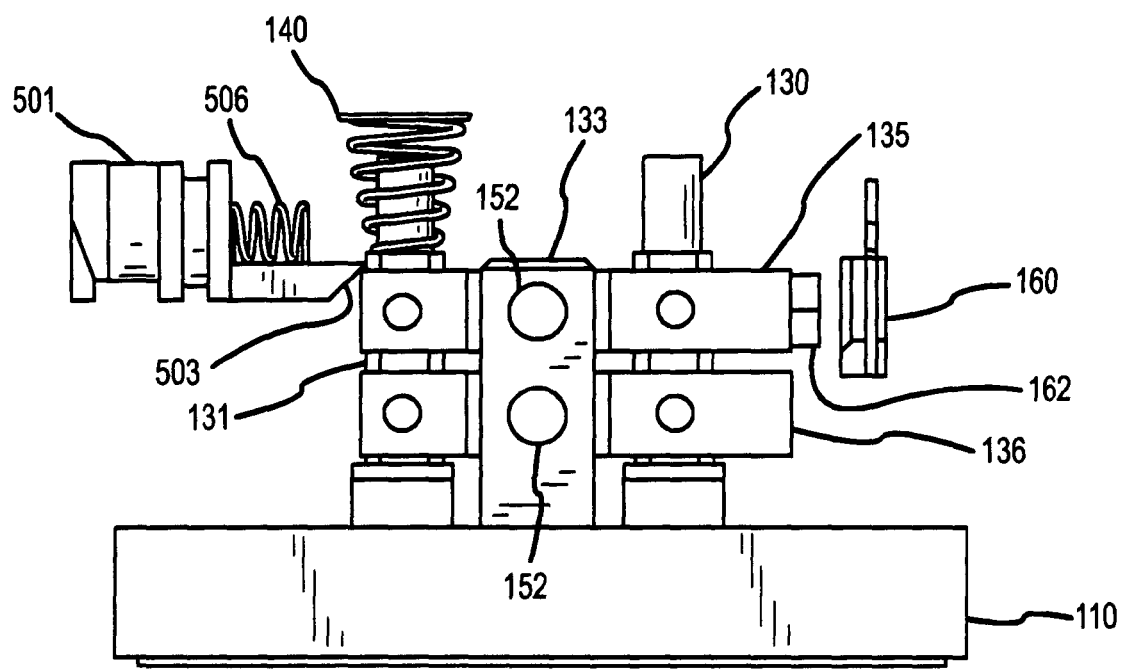
FIG. 6 is a side view of the rocker valve mechanism according to an embodiment of the invention.

FIG. 6 is a side view of the rocker valve mechanism 125 according to an embodiment of the invention. This figure shows the manual actuation plunger 501 in a spatial relationship to the rocker valve mechanism 125. In addition, the figure shows a position sensor 160 in a spatial relationship to the rocker valve mechanism 125.

The position sensor 160 electronically senses the position of the rocker valve mechanism 125 and generates a positional signal. The positional signal can be used to determine whether the valve 100 is actuated or non-actuated. The positional signal can be used to determine any position of the rocker valve mechanism 125 between the actuated and non-actuated positions.

In the embodiment shown, the position sensor 160 interacts with a magnet 162 in order to generate the positional signal. The magnet 162 is affixed to the rocker valve mechanism 125.

The magnet 162 is affixed to the upper pivot arm 135 in the embodiment shown in the figure. However, it should be understood that the magnet 162 can be affixed to other structures of the rocker valve mechanism 125, including the lower pivot arm 136 or the first plunger 130, for example.

Figure 7:
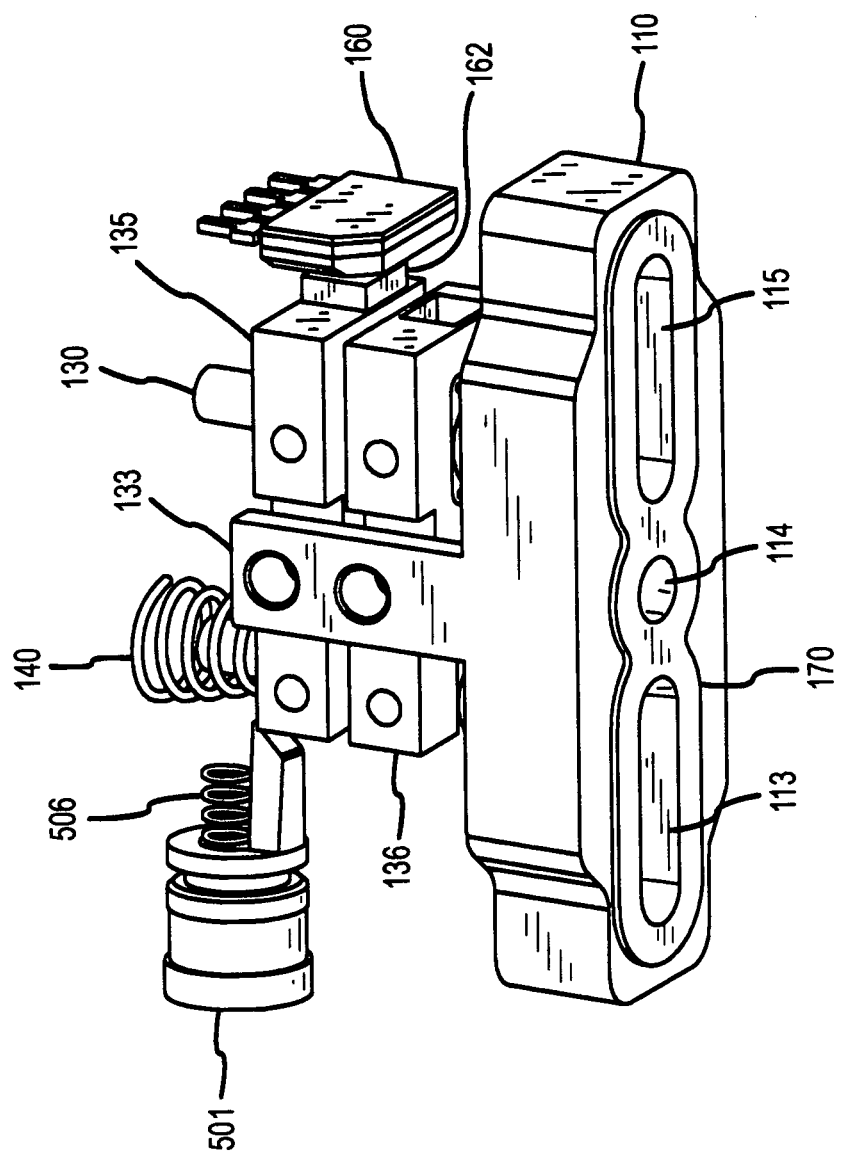
FIG. 7 shows an underside of the rocker valve mechanism according to an embodiment of the invention.

FIG. 7 shows an underside of the rocker valve mechanism 125 according to an embodiment of the invention. This view shows the first port 113, the second port 114, and the third port 115. In the embodiment shown, the first port 113 and the third port 115 comprise elongated slots, while the second port 114 comprises a substantially circular port. Corresponding fittings can be accepted by the ports 113-115. The rocker valve mechanism 125 can further include a gasket 170 that seals one or more corresponding fittings to the port portion 110. A fitting can compress the gasket 170 in order to form a seal.

The rocker valve mechanism and rocker valve according to the invention can be employed according to any of the embodiments in order to provide several advantages, if desired. The invention provides a rocker valve mechanism wherein sealing portions are displaced substantially parallel to each other. The invention provides a rocker valve mechanism that features a reduced displacement span of the rocker biasing device. The invention provides a rocker valve mechanism that features an improved rigidity. The invention provides a rocker valve mechanism that can be configured to provide a desired actuation force and a desired actuation travel. The invention provides a rocker valve mechanism that guarantees contact between a sealing member and a valve seat. The invention provides a rocker valve mechanism that features an improved sealing member lifespan. The invention provides a rocker valve mechanism that enables configuration of port sizes and port spacings. The invention provides a rocker valve mechanism that accommodates various valve seat diameters. The invention provides a rocker valve mechanism that provides a reduced internal dead volume and that can be more quickly flushed than in the prior art. The invention provides a configurable port portion that can reduce an area of a port interface.

What is claimed is:

1. A rocker valve (100), comprising:
a valve body (101); and
a rocker valve mechanism (125) located at least partially within the valve body (101), with the rocker valve mechanism (125) comprising:
a port portion (110) including a plurality of ports (113-115);
a pivot post (133) extending from the port portion (110);
an upper pivot arm (135) pivotally attached to the pivot post (133);
a lower pivot arm (136) pivotally attached to the pivot post (133);
a first plunger (130) configured to be actuated by an actuator (145), with the first plunger (130) being pivotally attached to first ends (161) of the upper pivot arm (135) and the lower pivot arm (136); and
a second plunger (131) pivotally attached to second ends (162) of the upper pivot arm (135) and the lower pivot arm (136) and acting in opposition and moving in parallel with the first plunger (130), with the rocker valve mechanism (125) being biased toward a first position blocking a first port (113) and configured to be actuated to a second position blocking a third port (115);
wherein the upper pivot arm (135) and the lower pivot arm (136) move the first plunger (130) and the second plunger (131) perpendicularly with respect to corresponding first and second valve seats (112a) and (112b).

2. The rocker valve (100) of claim 1, with the rocker valve mechanism (125) being biased toward the first position with the first plunger (130) blocking the first port (113) and configured to be actuated to the second position with the second plunger (131) blocking the third port (115).

3. The rocker valve (100) of claim 1, with the rocker valve mechanism (125) comprising a modular rocker valve mechanism (125).

4. The rocker valve (100) of claim 1, with the plurality of ports (113-115) being separated by predetermined spacings.

5. The rocker valve (100) of claim 1, with the plurality of ports (113-115) comprising a plurality of configurable ports (113-115).

6. The rocker valve (100) of claim 1, with the rocker valve mechanism (125) further comprising a seal member (120) extending over both the first plunger (130) and the second plunger (131), with the seal member (120) being movable by the first plunger (130) and by the second plunger (131) to alternatingly contact a first valve seat (112a) of the first port (113) and a second valve seat (112b) of the third port (115).

7. The rocker valve (100) of claim 6, with the first plunger (130) including a first plunger head (137) and the second plunger (131) including a second plunger head (138), with the first plunger head (137) fitting into a first sealing region (121) of the seal member (120) and with the second plunger head (138) fitting into a second sealing region (122).

8. The rocker valve (100) of claim 6, with the rocker valve mechanism (125) further comprising:
a rocker biasing device (140) configured to place a biasing force on the second plunger (131); and
the actuator (145) configured to bias the first plunger (130) and a first seal region of the seal member (120) toward a normally closed position and into contact with a first valve seat (112a) of the first port (113).

9. The rocker valve (100) of claim 1, further comprising a manual actuation plunger (501) configured to transfer an external actuation force to the rocker valve mechanism (125) in opposition to an armature biasing device (148).

10. The rocker valve (100) of claim 1, further comprising a manual actuation plunger (501) configured to transfer an external actuation force to the rocker valve mechanism (125) in opposition to an armature biasing device (148), with the manual actuation plunger (501) including an actuator projection (502) including an angled face (503).

11. The rocker valve (100) of claim 1, further comprising a position sensor (160) that generates a positional signal related to an actuation position of the rocker valve mechanism (125).

12. The rocker valve (100) of claim 1, further comprising a magnet (162) affixed to the rocker valve mechanism (125) and a position sensor (160) affixed to the valve body (101), wherein the position sensor (160) generates a positional signal related to an actuation position of the rocker valve mechanism (125).

13. A rocker valve (100), comprising:
a valve body (101); and
a rocker valve mechanism (125) located at least partially within the valve body (101), with the rocker valve mechanism (125) comprising:
a port portion (110) including a plurality of ports (113-115);
a pivot post (133) extending from the port portion (110);
an upper pivot arm (135) pivotally attached to the pivot post (133);

a lower pivot arm (136) pivotally attached to the pivot post (133);

a first plunger (130) configured to be actuated by an actuator (145), with the first plunger (130) being pivotally attached to first ends (161) of the upper pivot arm (135) and the lower pivot arm (136);

a second plunger (131) pivotally attached to second ends (162) of the upper pivot arm (135) and the lower pivot arm (136) and acting in opposition and moving in parallel with the first plunger (130), with the rocker valve mechanism (125) being biased toward a first position blocking a first port (113) and configured to be actuated to a second position blocking a third port (115); and a seal member (120) extending over both the first plunger (130) and the second plunger (131), with the seal member (120) being movable by the first plunger (130) and by the second plunger (131) to alternatingly contact a first valve seat (112a) of the first port (113) and a second valve seat (112b) of the third port (115);

wherein the upper pivot arm (135) and the lower pivot arm (136) move the first plunger (130) and the second plunger (131) perpendicularly with respect to corresponding first and second valve seats (112a) and (112b).

14. The rocker valve (100) of claim 13, with the rocker valve mechanism (125) being biased toward the first position with the first plunger (130) blocking the first port (113) and configured to be actuated to the second position with the second plunger (131) blocking the third port (115).

15. The rocker valve (100) of claim 13, with the rocker valve mechanism (125) comprising a modular rocker valve mechanism (125).

16. The rocker valve (100) of claim 13, with the plurality of ports (113-115) being separated by predetermined spacings.

17. The rocker valve (100) of claim 13, with the plurality of ports (113-115) comprising a plurality of configurable ports (113-115).

18. The rocker valve (100) of claim 13, with the first plunger (130) including a first plunger head (137) and the second plunger (131) including a second plunger head (138), with the first plunger head (137) fitting into a first sealing region (121) of the seal member (120) and with the second plunger head (138) fitting into a second sealing region (122).

19. The rocker valve (100) of claim 13, with the rocker valve mechanism (125) further comprising:

a rocker biasing device (140) configured to place a biasing force on the second plunger (131); and the actuator (145) configured to bias the first plunger (130) and a first seal region of the seal member (120) toward a normally closed position and into contact with a first valve seat (112a) of the first port (113).

20. The rocker valve (100) of claim 13, further comprising a manual actuation plunger (501) configured to transfer an external actuation force to the rocker valve mechanism (125) in opposition to an armature biasing device (148).

21. The rocker valve (100) of claim 13, further comprising a manual actuation plunger (501) configured to transfer an external actuation force to the rocker valve mechanism (125) in opposition to an armature biasing device (148), with the manual actuation plunger (501) including an actuator projection (502) including an angled face (503).

22. The rocker valve (100) of claim 13, further comprising a position sensor (160) that generates a positional signal related to an actuation position of the rocker valve mechanism (125).

23. The rocker valve (100) of claim 13, further comprising a magnet (162) affixed to the rocker valve mechanism (125) and a position sensor (160) affixed to the valve body (101), wherein the position sensor (160) generates a positional signal related to an actuation position of the rocker valve mechanism (125).

* * * * *